United States Patent
Wang (10) Patent No.: US 6,726,213 B2
(45) Date of Patent: Apr. 27, 2004

(54) BI-DIRECTION ROTATABLE FACE SEAL WITH SPIRAL GROOVES

(76) Inventor: Yuming Wang, Keyandong Road,#7, Nankai District, Tianjin, 300192, P.R. (CN)

( * ) Notice: Subject to any disclaimer, the term of this patent is extended or adjusted under 35 U.S.C. 154(b) by 0 days.

(21) Appl. No.: 10/046,774

(22) Filed: Jan. 17, 2002

(65) Prior Publication Data

US 2002/0093141 A1 Jul. 18, 2002

(51) Int. Cl.$^7$ ............................................. F16J 15/34
(52) U.S. Cl. ....................... 277/400; 277/403; 277/559
(58) Field of Search ............................ 277/399, 400, 277/403, 559

(56) References Cited

U.S. PATENT DOCUMENTS

| | | | |
|---|---|---|---|
| 4,212,475 A | | 7/1980 | Sedy ............................ 277/96 |
| 4,420,162 A | * | 12/1983 | Yanai et al. .................. 277/400 |
| 5,090,712 A | * | 2/1992 | Pecht et al. ................... 277/400 |
| 5,133,562 A | * | 7/1992 | Lipschitz ...................... 277/400 |
| 5,201,531 A | * | 4/1993 | Lai ............................... 277/400 |
| 5,368,314 A | * | 11/1994 | Victor et al. .................. 277/400 |
| 5,398,943 A | * | 3/1995 | Shimizu et al. .............. 277/400 |
| 5,435,574 A | | 7/1995 | Victor et al. .................. 277/96 |
| 5,498,007 A | * | 3/1996 | Kulkarni et al. ............. 277/400 |
| 5,501,470 A | * | 3/1996 | Fuse et al. .................... 277/400 |
| 5,529,315 A | * | 6/1996 | Borrino et al. ............... 277/352 |
| 5,713,576 A | * | 2/1998 | Wasser et al. ................ 277/304 |
| 6,152,452 A | | 11/2000 | Wang .......................... 277/400 |

FOREIGN PATENT DOCUMENTS

| | | | | |
|---|---|---|---|---|
| EP | 0 499 370 A1 | | 8/1992 | |
| EP | 581681 A1 | * | 2/1994 | ............ F16J/15/34 |
| EP | 0 684 413 A1 | | 11/1995 | |
| JP | 04050559 A | * | 2/1992 | ............ F16J/15/34 |

\* cited by examiner

*Primary Examiner*—Anthony Knight
*Assistant Examiner*—Christopher J. Boswell
(74) *Attorney, Agent, or Firm*—Dykema Gossett PLLC (57) ABSTRACT

A bi-direction rotatable face seal with spiral grooves is provided comprising: a rotating ring with a sealing face sealed and fixed on a rotary shaft; a stationary ring with a sealing face mounted in a casing, which is sealed and axially aligned by means of an elastomeric O-ring, a thrust ring, springs and anti-rotating pins; the sealing face of the stationary ring is pushed into engagement with the sealing face of the rotating ring to form a sealing interface; sealing fluid is located on high pressure side of the sealing interface; the rotating ring can rotate relative to the stationary ring in bi-direction without contact. The spiral groove groups near a high pressure side are arranged on at least one sealing face of the rotating ring and the stationary ring; the equally-spaced spiral groove groups with segment lands distribute in circumferential direction; each spiral groove group is composed of one radial fluid feed-in groove and at least three rows of spiral grooves with spiral lands arranged in radial direction at equal pitch; the spiral grooves with spiral lands distribute symmetrically or quasi-symmetrically on the left side and the right side of the radial fluid feed-in groove, which can pump the sealing fluid downstream in bi-directional rotation; a non-grooved annular flat clam nearby low pressure side is arranged on the sealing face acting as a flow restrict dam and static sealing area.

17 Claims, 6 Drawing Sheets

BI-DIRECTION ROTATABLE FACE SEAL WITH SPIRAL GROOVES

TECHNICAL FIELD OF THE INVENTION

This invention relates to a rotatable face seal for rotary machines, more especially to a bi-direction rotatable face seal with spiral grooves.

BACKGROUND OF THE INVENTION

Figure 5:
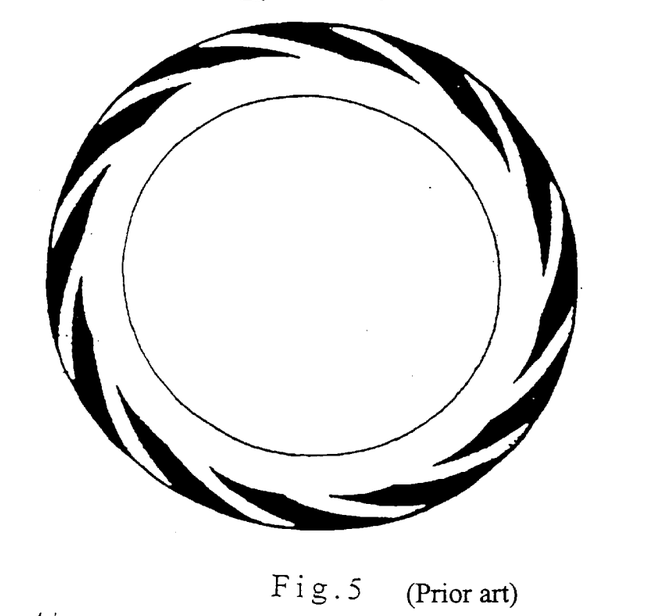
FIG. 5 is a front view of a sealing face suitable for unidirectional rotation according to a prior art.
Figure 6:
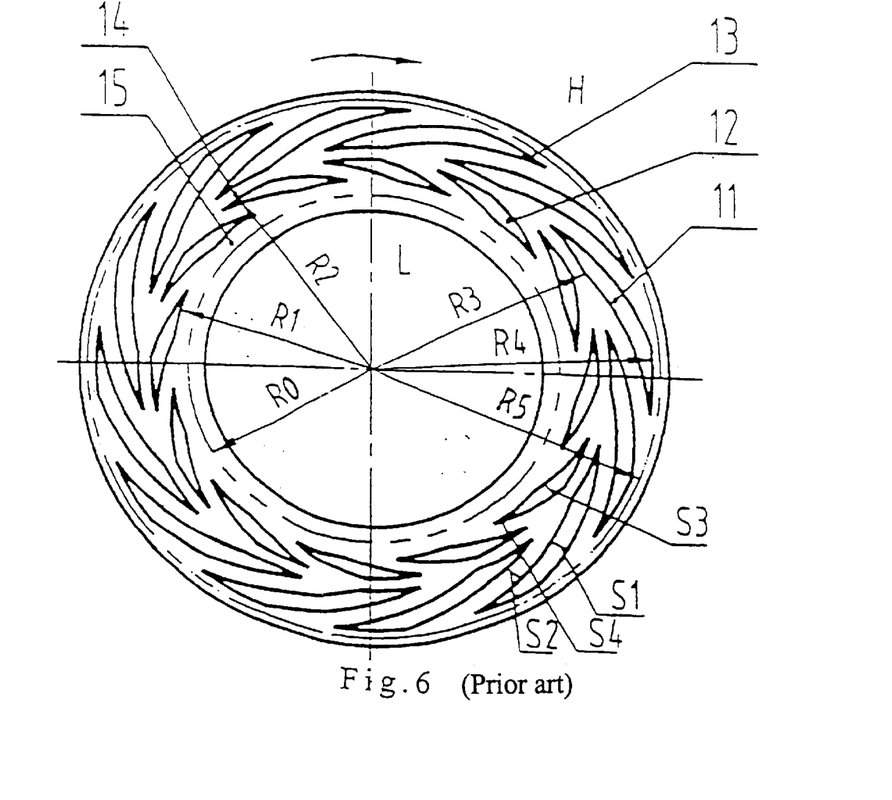
FIG. 6 is a front view of a sealing face suitable for unidirectional rotation according to another prior art.
Figure 7:
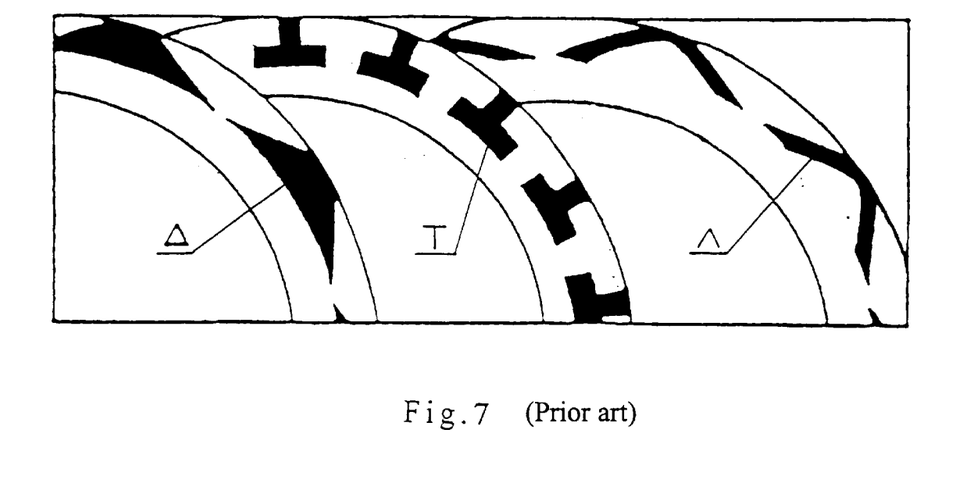
FIG. 7 is partially cut-away front view of three sealing faces suitable for bidirectional rotation according to the prior art.
Figure 8:
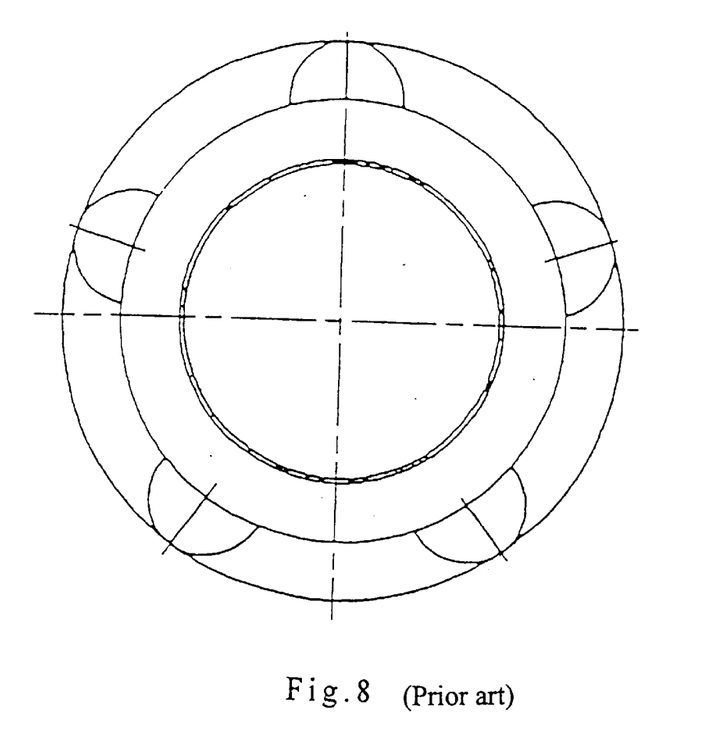
FIG. 8 is a front view with 'U'-shaped grooves of a sealing face suitable for bidirectional rotation according to a different prior art.
Figure 9:
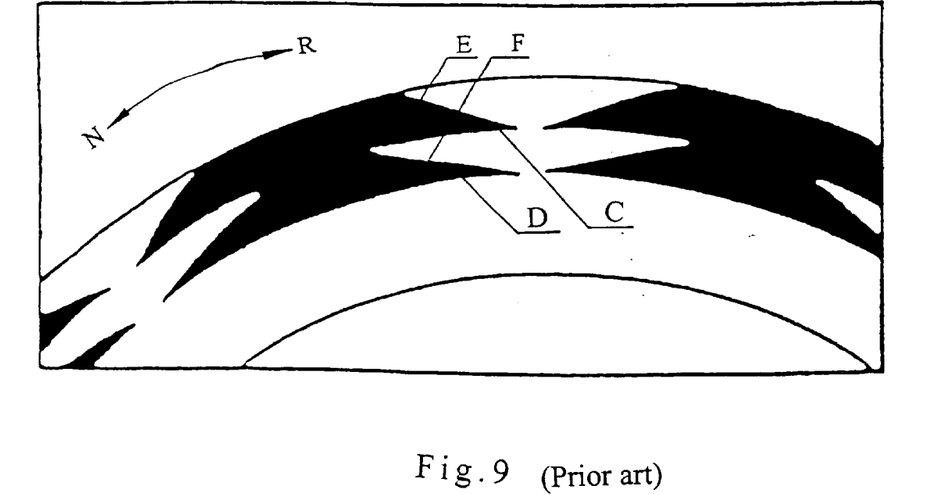
FIG. 9 is a partially cut-away front view with a plurality of trapezoid or triangular shape grooves on a sealing face suitable for bi-directional rotation according to another prior art.
Figure 10:
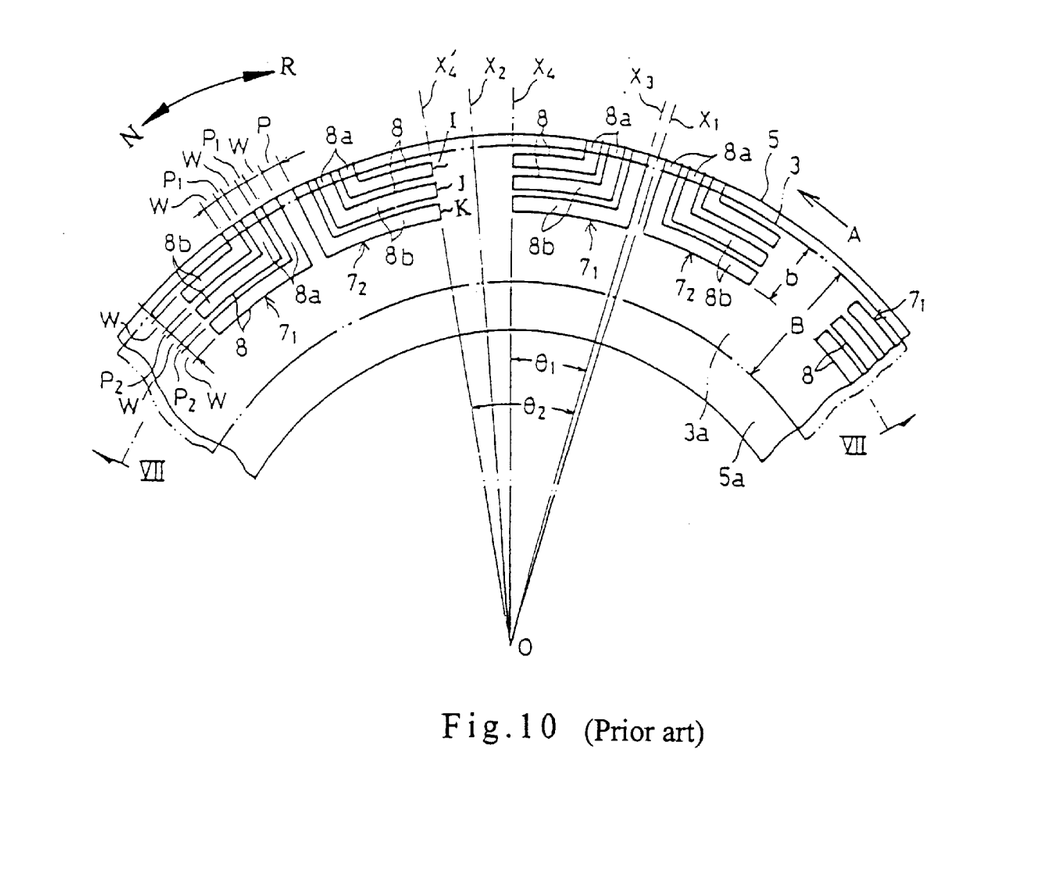
FIG. 10 is a partially cut-away front view with plural L-shaped grooves on a sealing face suitable for bi-directional rotation according to a different prior art.

Up to now, the gas-lubricated face seal so-called dry running gas seal or dry gas seal is the most advanced seal for various rotary machines especially for turbo-compressors treating process gases. The gas-lubricated face seals can be divided into unidirectional and bi-directional seals. Typical hydrodynamic groove patterns on a sealing face of the unidirectional gas-lubricated face seals are shown in FIG. 5 and FIG. 6 of U.S. Pat. Nos. 4,212,475 and 6,152,452, respectively. Regarding the bi-directional gas-lubricated face seals, some known hydrodynamic groove patterns on a sealing face in the prior art are shown in FIG. 7 to FIG. 10. As shown in FIG. 7, U.S. Pat. No. 5,435,574 discloses a groove pattern Δ in trapezoidal shape, a groove pattern Λ in 'Λ' shape (a Chinese character), and a groove pattern T in 'T' shape. In FIG. 8, another prior groove pattern has a 'U' shape with varied depth. FIG. 9 of EP 0 499 370 A1 discloses a groove pattern pluralizing of the trapezoid or triangular groove patterns shown in FIG. 7. When the rotary shaft and the rotating ring rotate in a direction indicated by arrow 'N' in FIG. 9, the groove regions may pump the sealing fluid in radial and circumferential directions. However, the hydrodynamic action caused by the groove pattern in FIG. 9 is not very efficient since each groove is comprised of one spiral side wall E, F and one circular side wall C, D. FIG. 10 of EP 0 684 413 A1 discloses a groove pattern pluralizing of the groove patterns T (double 'L' patterns). When the rotary shaft and the rotating ring rotate in a direction indicated by arrow 'N' in FIG. 10, the groove regions only pump the sealing fluid in a circumferential direction since the pressure peak is formed at the locations I, J, K of the groove. To avoid the aforesaid problems, a more efficient bi-direction rotatable gas-lubricated face seal with a new groove pattern is needed.

SUMMARY OF THE INVENTION

The object of the present invention is to provide a bi-direction rotatable gas-lubricated face seal with a new groove pattern that may contribute more efficient hydrodynamic action, and the sealing faces of the rotating ring and the stationary ring can maintain a non-contacting condition more steadily. The gas-lubricated face seals according to the present invention have been lab tested sufficiently and their performances are excellent.

The present invention provides a bi-direction rotatable face seal with spiral grooves comprising: a rotating ring with a sealing face sealed and fixed on a rotary shaft; a stationary ring with a sealing face mounted in a casing, which is sealed and axially aligned by means of an elastomeric O-ring, a thrust ring, springs and anti-rotating pins; the sealing face of the stationary ring is pushed into engagement with the sealing face of the rotating ring to form a sealing interface; sealing fluid is located on the high pressure side of the sealing interface; the rotating ring can rotate relative to the stationary ring in bi-direction without contact. The spiral groove groups near the high pressure side are arranged on at least one sealing face of the rotating ring and the stationary ring; the spiral groove groups with segment lands distribute in a circumferential direction; each spiral groove group comprises one radial fluid feed-in groove and at least three rows of spiral grooves with spiral lands arranged in a radial direction; the spiral grooves with spiral lands distribute symmetrically or quasi-symmetrically on the left side and the right side of the radial fluid feed-in groove to form two half groove regions, which can pump the sealing fluid downstream when the rotary shaft and the rotating ring rotate in normal or reverse direction; a non-grooved annular flat dam near the low pressure side is arranged on the sealing face acting as a flow restrict dam and static sealing area. The feature of the hydrodynamic groove pattern on a sealing face according to the present invention can be further described as follows: each spiral groove group is formed by superimposition of one 'I'-shaped groove, as a fluid feed-in groove, and three or more 'Λ'-shaped grooves, as bi-directional downstream pumping grooves and the whole shape of each groove group resembles a Chinese character ' '.

The experimental investigations indicate that the performance of the bi-directional dry running gas seals according to the present invention is excellent.

The face seals designed and manufactured according to the present invention can be used for various rotary machines, such as turbo-compressors, turbo-expanders, screw compressors, pumps and agitators, etc.

DETAILED DESCRIPTION OF THE INVENTION

The characteristic of the invention is described in detail referring to the embodiments shown in FIG. 1 to FIG. 4.

Figure 1:
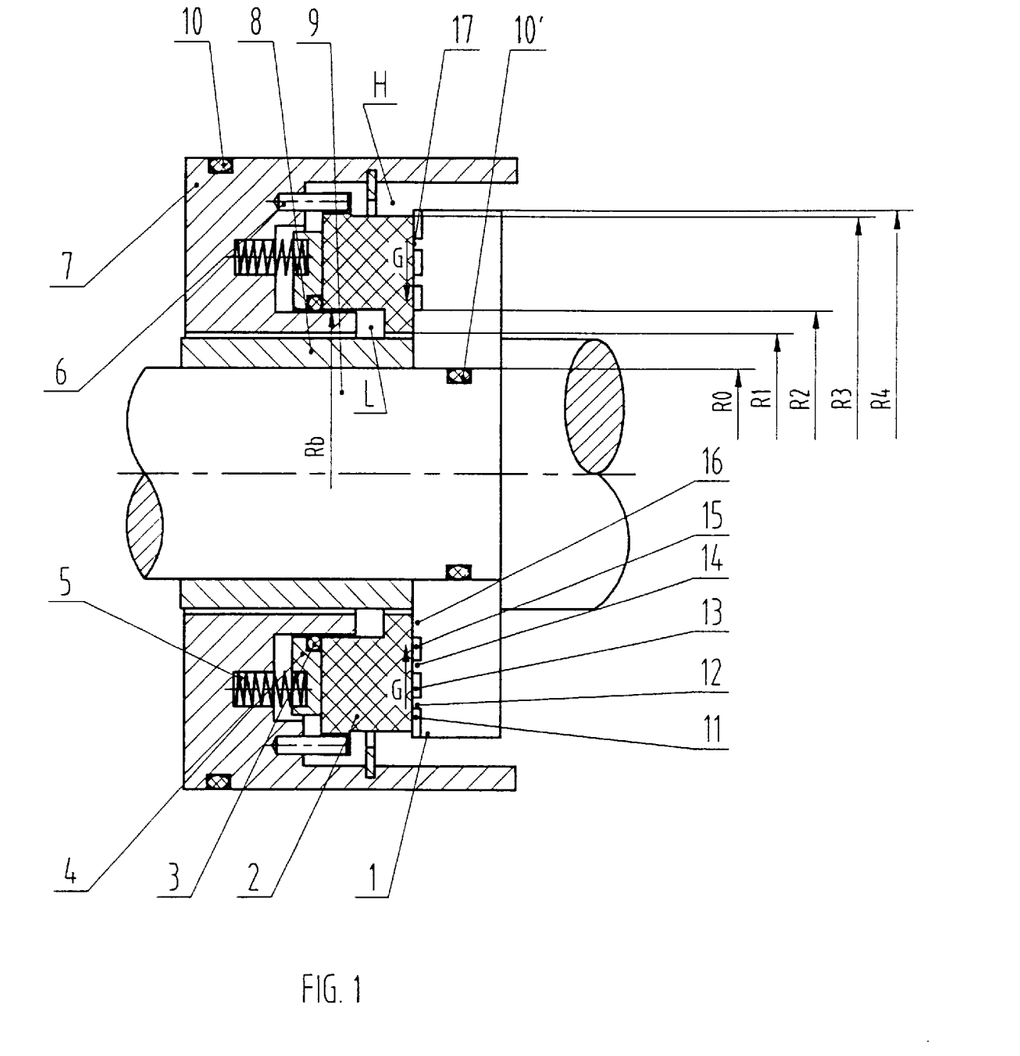
FIG. 1 is a sectional view showing a schematic structure of the face seal according to the present invention.

FIG. 1 discloses a schematic structure of a face seal according to the present invention. The seal includes a rotating ring 1, a stationary ring 2, a secondary sealing ring 3, which may be an elastomeric O-ring or similar device, a thrust ring 4, springs 5, anti-rotating pins 6, casing 7, sleeve 8, rotary shaft 9 and static sealing rings 10 and 10'. Rotating ring 1 whose inner radius and outer radius are $R_1$, and $R_4$, respectively, is sealed and fixed on the rotary shaft 9. Stationary ring 2 is mounted in casing 7, which is sealed and axially aligned by means of secondary sealing ring 3, thrust ring 4, springs 5 and anti-rotating pins 6. The sealing face of the stationary ring 2 is pushed into engagement with the sealing face of the rotating ring 1 to form a sealing interface 17. The sealing fluid with high pressure such as filtered clean gas is located on H side, i.e., on OD (outer diameter) side of the sealing interface and the low-pressure gas such as atmosphere is located on L side, i.e., on ID (inner diameter) side of the sealing interface. The rotating ring can rotate relative to the stationary ring in bi-direction without contact.

The bi-directional spiral groove groups including spiral grooves 11, 13 and 15 nearby high-pressure side H are configured on the sealing face of the rotating ring 1. The spiral lands 12 and 14 are between two adjacent spiral grooves. There is a non-grooved annular flat dam 16 near low-pressure side L. The spiral groove groups can pump sealing fluid downstream, i.e., from high pressure side to low pressure side as shown by arrow G in FIG. 1, when the rotary shaft 9 and the rotating ring 1 rotate in normal or reverse direction. And the annular flat dam 16 acts as a flow restrict dam and static sealing area. So that a higher pressure distribution of the sealing fluid on the sealing interface is built up and a sufficient opening force will balance the closing force acting on the back of the stationary ring 2 caused by spring force and differential pressure. A fluid film with enough thickness and stiffness will keep the faces of the rotating ring 1 and the stationary ring 2 non-contacting steadily. The object of the invention is to provide more efficient bi-directional spiral groove groups configured on a sealing face, especially relating but not limited to gas-lubricated face seals. It is to be noted that the spiral groove groups can also be provided on the sealing face of the stationary ring 2 even on both faces of the rotating and stationary rings. The sealing fluid with high pressure can also locate on the ID side depending on a particular application condition.

Figure 2:
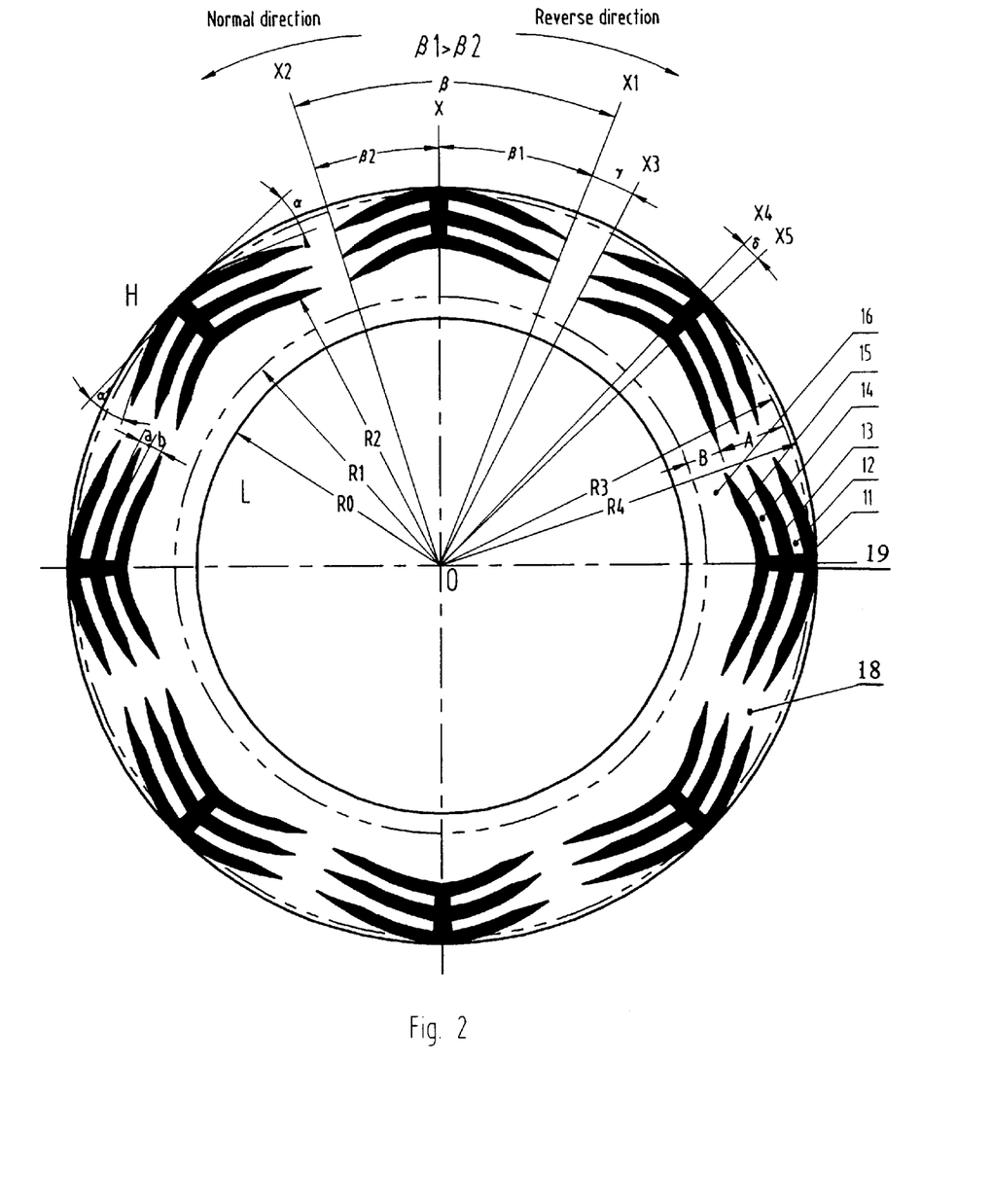
FIG. 2 is a front view showing a hydrodynamic groove pattern on the sealing face of the rotating ring illustrated in FIG. 1.

FIG. 2 is a front view showing a typical pattern of bi-directional spiral groove groups on the rotating sealing face shown in FIG. 1. H is the high pressure side and L is the low pressure side. $R_1$ and $R_3$ are the inner and outer radii of the engaged stationary ring 2 respectively. The area from $R_1$ to $R_3$ is the sealing interface region, the region from $R_2$ to $R_3$ is the groove region and the region from $R_1$ to $R_2$ is the annular flat dam region. The radial width of the groove region is A and the radial width of the annular flat dam is B. The normal rotating direction of the rotating ring 1 is anticlockwise and the reverse rotating direction is clockwise. The equally-spaced groove groups with segment lands 18 distribute in the circular direction on the sealing face. The angle in a circular segment occupied by each groove group is β, i.e., the included angle between the radial ray O-X1 and O-X2. Every non-grooved segment land is laid between two adjacent spiral groove groups in circumferential direction at equal pitch; the angle of circumference occupied by the segment land is Y, i.e., the included angle between the radial ray O-X1 and O-X3 in FIG. 2 and FIG. 3 or O-X2 and O-X6 in FIG. 4. Two side walls of a radial fluid feed-in groove 19 are arranged along two radial rays O-X4 and O-X5 towards the center O of the sealing face; the angle a circular segment of the radial fluid feed-in groove 19 is δ, i.e., the included angle between the radial ray O-X4 and O-X5. Every spiral groove wall profile is substantially a logarithm spiral but is not limited to an exact logarithm spiral. The spiral angle of a spiral is α or α'. The definition of α and α' is fully disclosed in the applicant's U.S. Pat. No. 6,152,452, with the disclosure of the latter being specifically incorporated herein by reference. Therefore, each groove group includes one radial fluid feed-in groove 19 and at least three rows of spiral grooves 11, 13, 15 with spiral lands 12, 14 arranged in a radial direction. Each groove group is divided into two half groove regions by the radial fluid feed-in groove 19 and one is on the right side and the other is on the left side of the radial fluid feed-in groove 19. The half groove region on the right side of the radial fluid feed-in groove is the primary half groove region that pumps the sealing fluid downstream while the rotary shaft and the rotating ring rotate in normal direction; the angle of circumference occupied by the primary half groove region is $β_1$, i.e., the included angle between the radial ray O-X and O-X1. Another half groove region on the left side of the radial fluid feed-in groove is the secondary half groove region that pumps sealing fluid downstream while the rotary shaft and the rotating ring rotate in reverse direction; the angle of circumference occupied by the secondary half groove region is $β_2$, i.e., the included angle between the radial ray O-X and O-X2. $β_1$ is larger than $β_2$. The spiral grooves in above regions are quasi-symmetric since $β_1 \neq β_2$. The spiral angle α of the spirals on the right side and the spiral angle α' of the spirals on the left side are opposite, supposing α is positive and then α' is negative, but absolute value of α and α' is equal, i.e., $|α|=|α'|$. The quasi-symmetric axis of the two half groove regions is radial ray O-X. Obviously, the primary half groove region corresponding to the angle β1, which pumps the sealing fluid downstream while the rotary shaft and the rotating ring rotate in normal direction, should be on the left side of the radial fluid feed-in groove 19 if the normal rotating direction of the totaling ring is clockwise. In each groove group, there are at least three rows of spiral grooves 11, 13, 15 which are arranged in radial direction close to each other and spaced at equal pitch by means of spiral lands 12, 14. The width of a spiral groove is a and the width of a spiral land is b. The pattern of each groove group resembles a Chinese character ' ' and may be considered as a superimposition of three 'Λ'-shaped grooves (a Chinese character) and one 'I'-shaped groove.

The geometry parameters are set to as follows: $|α|=|α'|=$ 5°–30°, preferably to be 10°–20°; $β/γ=1.2 –10$, preferably to be 2–6; $β_1/γ=1–5$, preferably to be 1–3; $β_1/β_2=1–5$, preferably to be 1–3; δ=0.2–2°a depending on the diameter of the sealing face; the width S (see FIG. 4) of the radial fluid feed-in groove is set to 0.5–3 mm, preferably to 0.5–2 mm; A/B=0.5–5, preferably to be 1–3; a/b=0.5–2, preferably to be 0.8–1.2, and a≈b≈5–5 mm, preferably to be 0.5–3 mm; the number of the spiral groove groups is 3–30, preferably to be 4–20; the number of the rows of the spiral grooves in radial direction in each groove group is set to 3 or more, preferably to 3–5 depending on the diameter of the sealing face; the depth of the radial fluid feed-in groove is set to 3 to 50 μm, preferably to 10–20 μm; the depth of the spiral grooves is set to 2–20 μm, preferably to 3–10 μm; the depth of the spiral grooves in a spiral groove group may be uniform but preferably varied, such as getting more and more shallow from the high pressure side, i.e., outer periphery $R_3$ (see FIG. 4) to the low pressure side, i.e., inner periphery $R_2$ of the sealing face and the depth of each spiral groove getting more and more shallow in circular direction from fluid feed-in groove to the right and left edges, i.e., from the radial ray O-X to the radial ray O-X1 and O-X2.

Figure 3:
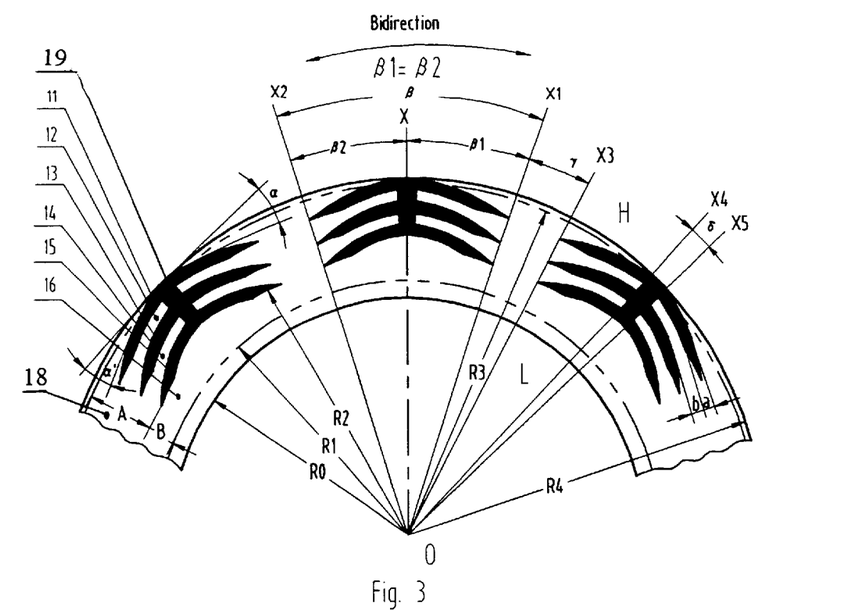
FIG. 3 is a view similar to FIG. 2 of a partially cut-away front view of a sealing face showing another embodiment according to the invention.

FIG. 3 is a partially cut-away front view of a sealing face showing another embodiment. In this embodiment, the spiral grooves on the right side and the left side of the radial fluid feed-in groove are completely symmetric, i.e., $\beta_1 = \beta_2$. The other features are the same as those of FIG. 2.

Figure 4:
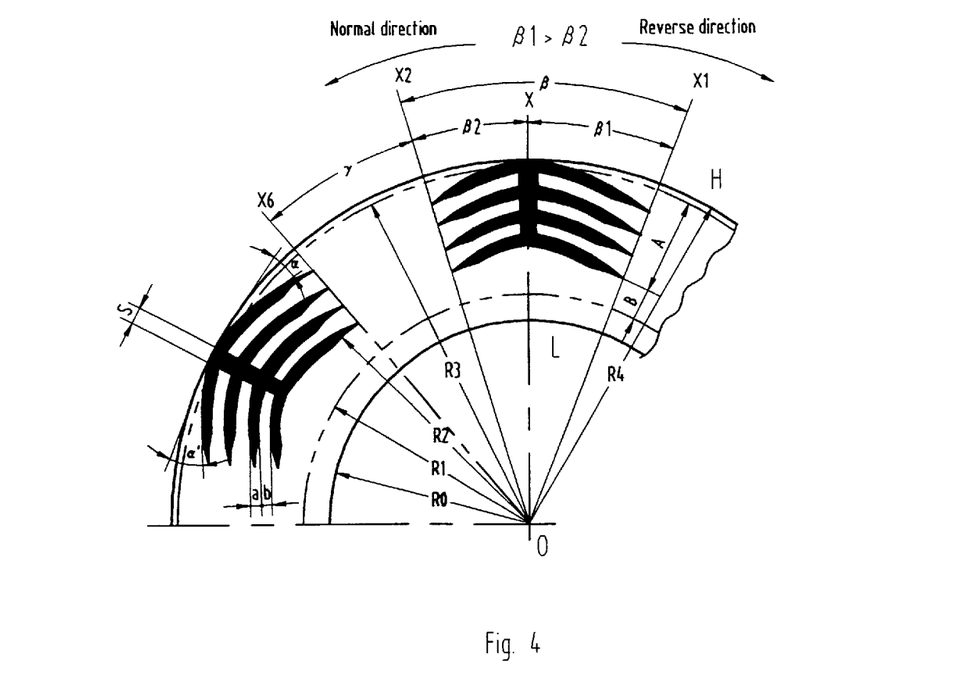
FIG. 4 is a view similar to FIG. 3 of a partially cut-away front view of a sealing face showing a different embodiment according to the invention.

FIG. 4 is a partially cut-away front view of a sealing face showing a different embodiment. In this embodiment, there are four rows of spiral grooves in radial direction in each groove group and two walls of the radial fluid feed-in groove 19 are parallel. The other features are the same as those of FIG. 2.

A comparison between the symmetric configuration shown in FIG. 3 and the quasi-symmetric configuration shown in FIG. 2 and FIG. 4 is made here. The virtue of the symmetric one is simpler management of design, manufacture, store and use. However, in many applications, for example for most turbo-compressors treating process gases, the machines regularly operate in normal direction and occasionally rotate in reverse direction with lower speed and shorter duration. The secondary half groove region is only to protect the seal from breakdown in occasionally reverse rotating condition. So the area of the secondary half groove region that pumps the sealing fluid downstream while the rotary shaft and the rotating ring rotate in reverse direction may be smaller and the depth of the grooves should be shallower than the primary half groove region that pumps the sealing fluid downstream while the rotary shaft and the rotating ring rotate in normal direction, therein $\beta_1 > \beta_2$ as shown in FIG. 2 and FIG. 4. So that the primary half groove region can take greater area in order to get stronger hydrodynamic action and more sufficient fluid film thickness and stiffness with higher reliability in regular operating condition. Therefore, the quasi-symmetric configuration is preferred to be proposed rather than the symmetric configuration for this operating condition.

The present invention is not limited to the above mentioned, but may be properly changed or modified without departing from the true spirit and principle of the invention. For example, the sealing fluid may be liquid and the optimum depth of the grooves may be larger than the value mentioned above. The high pressure side may be on ID side of the sealing interface and the groove region should be arranged near the ID side of the sealing face and the annular flat dam is near the OD side of the sealing face. The groove groups may be set on the sealing face of the stationary ring even on both faces of the rotating ring and the stationary ring. The geometry parameters of the grooved sealing face may be modified according to the principle of the invention and to specific application conditions, and so on.

What is claimed is:

1. A bi-direction rotatable face seal with bi-directional spiral grooves for rotary machines, said bi-direction rotatable face seal comprising: a rotating ring with a sealing face sealed and fixed on a rotary shaft; a stationary ring with a sealing face mounted in a casing, which is sealed and axially aligned by means of an elastomeric O-ring, a thrust ring, springs and anti-rotating pins, the sealing face of the stationary ring being disposed in engagement with the sealing face of the rotating ring to form a sealing interface; sealing fluid located on a high pressure side of the sealing interface; the rotating ring rotating relative to the stationary ring in bi-direction without contact; bi-directional spiral groove groups near the high pressure side being arranged on the sealing face of at least one of the rotating ring and the stationary ring; each of the bi-directional spiral groove groups including segment lands distributed substantially equally in a circumferential direction between the groups; each of the spiral groove groups comprising at least three rows of spiral grooves with spiral lands arranged in a radial direction at a substantially equal pitch and one radial fluid feed-in groove intersecting with each of the spiral grooves; the spiral grooves with spiral lands being distributed symmetrically or quasi-symmetrically on a left side and a right side of the radial fluid feed-in groove to form two half groove regions, wherein a spiral angle $\alpha$ of every spiral groove side wall in a primary half groove region, which pumps the sealing fluid downstream in a normal rotation direction, is greater than 0°, and a spiral angle $\alpha'$ of every spiral groove side wall in a secondary half groove region, which pumps sealing fluid downstream in a reverse rotating direction, is less than 0°, $\alpha$ and $\alpha'$ are opposite and the absolute value of $\alpha$ and $\alpha'$ is the same such that generally $|\alpha|=|\alpha'|$; and a non-grooved annular substantially flat dam near a low pressure side being arranged on the sealing face of the rotating ring or the stationary ring to act as a flow restrict dam and static sealing area.

2. The bi-direction rotatable face seal with spiral grooves as claimed in claim 1, wherein a profile of every spiral groove side wall is an exact or approximate logarithm spiral; the absolute value of the spiral angle of them $\alpha$ and $\alpha'$ being set to 5°–30°, preferably to 10°–20°.

3. The bi-direction rotatable face seal with spiral grooves as claimed in claim 1, wherein a number of the spiral groove groups equally-spaced arranged in circumferential direction is set to 3–30, preferably to 4–20.

4. The bi-direction rotatable face seal with spiral grooves as claimed in claim 1, wherein a radial width of the groove region from $R_2$ to $R_3$ is A; a radial width of the annular flat dam from $R_1$ to $R_2$ is B; and the ratio of A to B is set to 0.5–5, preferably to 1–3, $R_1$, $R_2$ and $R_3$ being radial distances measured from a central axis of said bi-direction rotatable face seal.

5. The bi-direction rotatable face seal with spiral grooves as claimed in claim 1, wherein a number of the rows of the spiral grooves in radial direction in each spiral groove group is set to at least 3, preferably to 3–5.

6. The bi-direction rotatable face seal with spiral grooves as claimed in claim 1, wherein the half groove region that pumps the sealing fluid downstream in normal rotating direction is the primary half groove region, and the angle of a circular segment of said region, such as the included angle between a radial ray O-X and O-X1, is $\beta_1$; the other half groove region that pumps the sealing fluid downstream in reverse rotating direction is the secondary half groove region, and the angle of a circular segment of said region, such as the included angle between a radial ray O-X and O-X2, is $\beta_2$; the ratio of $\beta_1$ to $\beta_1$ is set to 1–5, preferably to 1–3; wherein the primary and secondary half groove region are quasi-symmetric for $\beta_1/\beta_2>1$ or symmetric for $\beta_1/\beta_2=1$, the angle of circumference of each spiral groove group, such as the included angle between radial ray O-X1 and O-X2, is $\beta$, and $\beta=\beta_1+\beta_2$.

7. The bi-direction rotatable face seal with spiral grooves as claim in claim 6, wherein the angle of circumference of each segment land, such as the included angle between radial ray O-X1 and O-X3 or O-X2 and O-X6, is $\gamma$, and the ratio of $\beta_1$ to $\gamma$ is set to 1.2–10, preferably to 2–6.

8. The bi-direction rotatable face seal with spiral grooves as claimed in claim 1, wherein a normal width a of a spiral groove is set to 0.5–5 mm, preferable to 0.5–3 mm.

9. The bi-direction rotatable face seal with spiral grooves as claimed in claim 1, wherein the at least three rows of spiral grooves in each spiral groove group are equally-spaced arranged in radial direction; each spiral land is laid between two adjacent spiral grooves; the normal width b of a spiral land is set to 0.5–5 mm, preferably to 0.5–3 mm, and the ratio of a to b is set to 0.5–2, preferably to 0.8–1.2.

10. The bi-direction rotatable face seal with spiral grooves as claimed in claim 1, wherein a depth of every spiral grooves is uniform and is set to 2–20 μm, preferably to 3–10 μm.

11. The bi-direction rotatable face seal with spiral grooves as claimed in claim 1, wherein a depth of every row of spiral grooves in each spiral groove group is varied in radial direction and gets more and more shallow from high pressure side to low pressure side; and the depth is set to 2–20 μm, preferably to 3–10 μm.

12. The bi-direction rotatable face seal with spiral grooves as claimed in claim 1, wherein a depth of each spiral groove in each spiral groove group gets more and more shallow in circumferential direction from the fluid feed-in groove to the right or left edges and in radial direction from high pressure side to low pressure side; and the depth is set to 2–20 μm, preferably to 3–10 μm.

13. The bi-direction rotatable face seal with spiral grooves as claimed in claim 1, wherein a depth of the spiral grooves in the secondary half groove region is shallower than the primary half groove region.

14. The bi-direction rotatable face seal with spiral grooves as claimed in claim 1, wherein the radial fluid feed-in groove in a spiral groove group is arranged between a radial ray O-X4 and O-X5, and the included angle δ between a radial ray O-X4 and O-X5 is set to 0.2°–2°; and the width of the groove is between 0.5–3 mm, preferably 0.5–2 mm.

15. The bi-direction rotatable face seal with spiral grooves as claimed in claim 1, wherein two walls of the radial fluid feed-in groove in a spiral groove group are parallel and a normal width S of the groove is set to 0.5–3 mm, preferably to 0.5–2 mm.

16. The bi-direction rotatable face seal with spiral grooves as claimed in claim 1, wherein a depth of the radial fluid feed-in groove in each spiral groove group is uniform, and said depth is set to 3–50 μm, preferably to 10–20 μm.

17. The bi-direction rotatable face seal with spiral grooves as claimed in claim 1, wherein a depth of the radial fluid feed-in groove in each spiral groove group is varied and is gradually more and more shallow from the high pressure side to the low pressure side; said depth being set to 3–50 μm, preferably to 10–20 μm.

* * * * *